US012798717B2

(12) United States Patent
Reilly et al.

(10) Patent No.: US 12,798,717 B2
(45) Date of Patent: Nov. 17, 2026

(54) HANDGRIP ASSEMBLY FOR A VEHICLE

(71) Applicant: Indian Motorcycle International, LLC, Medina, MN (US)

(72) Inventors: Nicole A. Reilly, Stanchfield, MN (US); Jared Kugler, Oberursel (DE); Samuel J. Michels, Hugo, MN (US)

(73) Assignee: POLARIS INDUSTRIES, INC., Medina, MN (US)

( * ) Notice: Subject to any disclaimer, the term of this patent is extended or adjusted under 35 U.S.C. 154(b) by 0 days.

(21) Appl. No.: 18/696,332

(22) PCT Filed: Sep. 29, 2022

(86) PCT No.: PCT/US2022/077212
§ 371 (c)(1),
(2) Date: Mar. 27, 2024

(87) PCT Pub. No.: WO2023/056322
PCT Pub. Date: Apr. 6, 2023

(65) Prior Publication Data

US 2025/0002111 A1 Jan. 2, 2025

Related U.S. Application Data

(60) Provisional application No. 63/249,782, filed on Sep. 29, 2021.

(51) Int. Cl.
*B62K 21/26* (2006.01)
*B29C 70/78* (2006.01)
(Continued)

(52) U.S. Cl.
CPC .............. *B62K 21/26* (2013.01); *B29C 70/78* (2013.01); *B29C 70/84* (2013.01); *B62J 33/00* (2013.01)

(58) Field of Classification Search
CPC ........ B62K 21/26; B62K 23/02; B62K 23/04; B62J 11/19; B62J 33/00; B29C 70/78; B29C 70/84
See application file for complete search history.

(56) References Cited

U.S. PATENT DOCUMENTS 499,103 A * 6/1893 Goddard ................ B62K 21/26 74/543
605,626 A * 6/1898 Blanchard .............. B62K 21/26 74/551.9
(Continued)

FOREIGN PATENT DOCUMENTS

CN 108137121 6/2018
CN 112771267 5/2021
(Continued)

OTHER PUBLICATIONS

International Search Report and Written Opinion issued by the International Searching Authority, dated Dec. 13, 2022, for International Patent Application No. PCT/US2022/077212; 8 pages.
(Continued)

*Primary Examiner* — Adam D Rogers
(74) *Attorney, Agent, or Firm* — SCHWEGMAN LUNDBERG & WOESSNER, P.A.

(57) ABSTRACT

The present disclosure pertains to the construction of handgrips and the method of assembly onto a handlebar. In one disclosed embodiment, the handgrip comprises a substrate configured to receive a clamp, and a guard configured to protect the clamp. Further, the handgrip comprises an overmold grip configured to conceal the clamp and guard and also receive the hand of an operator or user. The clamp is engaged onto the handlebar and acts as a coupling mechanism so that the handgrip is more easily removable
(Continued)

from handlebar. Among other things, the present disclosure solves problems related to manufacturing and assembly.

16 Claims, 11 Drawing Sheets

(51) Int. Cl.
*B29C 70/84* (2006.01)
*B62J 33/00* (2006.01)

(56) References Cited

U.S. PATENT DOCUMENTS

| | | | | | |
|---|---|---|---|---|---|
| 2,788,676 | A * | 4/1957 | Spexarth | G05G 1/08 74/489 |
| 6,615,688 | B2 * | 9/2003 | Wessel | B62K 23/04 74/551.9 |
| 6,681,653 | B2 * | 1/2004 | Yu | B62K 21/26 74/551.8 |
| 8,234,952 | B2 * | 8/2012 | Ting | B62K 21/26 74/551.8 |
| 8,365,635 | B2 * | 2/2013 | Grimes | B62K 21/26 74/551.8 |
| 8,484,806 | B2 * | 7/2013 | Rarick | B62K 21/26 16/431 |
| 9,580,133 | B2 * | 2/2017 | Aymar | A63B 53/14 |
| 10,336,396 | B2 * | 7/2019 | Krause | B62K 21/26 |
| 11,242,112 | B2 * | 2/2022 | Graetz | B62K 21/26 |
| 11,572,125 | B1 * | 2/2023 | Hoglund | F16B 2/065 |
| 11,745,822 | B2 * | 9/2023 | Finnäs | B62K 21/26 74/551.9 |
| 2002/0119283 | A1 * | 8/2002 | Si | B62K 21/26 428/99 |
| 2004/0068844 | A1 | 4/2004 | Lumpkin | |
| 2007/0007266 | A1 | 1/2007 | Sasaki | |
| 2007/0157758 | A1 * | 7/2007 | Shih | B62K 21/26 74/551.9 |
| 2008/0156139 | A1 | 7/2008 | Lai | |
| 2009/0158884 | A1 * | 6/2009 | Kuo | B62K 21/26 74/551.9 |
| 2009/0255093 | A1 | 10/2009 | Hsu | |
| 2011/0277586 | A1 | 11/2011 | Yu | |
| 2012/0073086 | A1 | 3/2012 | Rarick | |
| 2012/0222265 | A1 * | 9/2012 | Chen | B62K 11/14 16/2.2 |
| 2017/0057589 | A1 | 3/2017 | Moeschler | |

FOREIGN PATENT DOCUMENTS

| | | | | |
|---|---|---|---|---|
| DE | 102018212198 | A1 * | 2/2019 | B62K 21/26 |
| EP | 3187404 | A1 * | 7/2017 | B25G 1/102 |
| EP | 4408729 | A1 | 8/2024 | |
| EP | 4408729 | A4 | 7/2025 | |
| FR | 912274 | A * | 8/1946 | |
| FR | 2915171 | A3 * | 10/2008 | B62K 21/26 |
| GB | 2548794 | A * | 10/2017 | B62K 21/26 |
| JP | H09156562 | | 6/1997 | |
| TW | I714180 | B | 12/2020 | |
| WO | 2023056322 | | 4/2023 | |

OTHER PUBLICATIONS

International Preliminary Report on Patentability issued by The International Bureau of WIPO, dated Apr. 2, 2024, for International Patent Application No. PCT/US2022/077212; 6 pages.

"Japanese Application Serial No. 2024-518218, Notification of Reasons for Rejection mailed Apr. 30, 2025", With English Translation, 16 pgs.

"International Application Serial No. PCT US2022 077212, International Search Report mailed Dec. 13, 2022", 2 pgs.

"International Application Serial No. PCT US2022 077212, Written Opinion mailed Dec. 13, 2022", 5 pgs.

"International Application Serial No. PCT US2022 077212, International Preliminary Report on Patentability mailed Apr. 11, 2024", 7 pgs.

"European Application Serial No. 22877546.6, Extended European Search Report mailed Jun. 30, 2025", 10 pgs.

"Japanese Application Serial No. 2024-518218, Decision of Rejection mailed Oct. 7, 2025", w/ English Translation, 10 pgs.

"Japanese Application Serial No. 2024-518218, Response filed Jul. 29, 2025 to Notification of Reasons for Rejection mailed Apr. 30, 2025", w/English claims, 22 pgs.

"European Application Serial No. 22877546.6, Response filed Jan. 12, 2026 to Extended European Search Report mailed Jun. 30, 2025", 10 pgs.

"European Application Serial No. 22877546.6, Response to Communication pursuant to Rules 1611 and 162 EPC filed Oct. 24, 2024", 7 pgs.

"European Application Serial No. 22877546.6, Communication Pursuant to Article 943 EPC mailed Jul. 20, 2026", 6 pgs.

"Chinese Application Serial No. 202280065060.4, Office Action mailed Jul. 28, 2026", W English translation, 22 pgs.

* cited by examiner

HANDGRIP ASSEMBLY FOR A VEHICLE

CROSS-REFERENCE TO RELATED APPLICATIONS

The present application is a national stage entry of International (PCT) Patent Application Number PCT/US2022/077212, filed Sep. 29, 2022, which claims priority to U.S. Provisional Patent Application Ser. No. 63/249,782, filed Sep. 29, 2021, the entire disclosures of which are expressly incorporated by reference herein.

FIELD OF THE DISCLOSURE

The present disclosure relates to a handgrip assembly for a vehicle and, more particularly, a handgrip assembly and method of assembling thereof that is devoid of adhesive.

BACKGROUND OF THE DISCLOSURE

Handgrips are commonly used to increase a user's ability to grip a component of a vehicle. Typically, these components are bars or handles that are extended out from some assembly that is designed to move, or in some cases act as an anchor. In general, the prior art comprises handgrip assemblies that require adhesives to adhere a substrate to a base bar or component. Previous designs are therefore difficult to interchange, and sometimes require destruction of the handgrip itself to remove it from the base bar or component. The embodiments disclosed below seek to remedy some of these issues.

SUMMARY OF THE DISCLOSURE

In one embodiment, a steering assembly for a vehicle comprises a handlebar operably coupled to at least one ground engaging member, and the steering assembly is configured to steer the at least one ground engaging member. The steering assembly further comprises a handgrip operably coupled to the handlebar. The handgrip comprises a clamp and a substrate configured to receive the clamp, and the clamp is configured to engage the handlebar. The handgrip further comprises an outer portion configured to cover a portion of the substrate.

In another embodiment, a method of assembling a handgrip comprises providing a substrate with a generally cylindrical shape. The method of assembling a handgrip further comprises a clamp configured to engage a portion of the substrate and molding an outer portion over the substrate and clamp.

In yet another embodiment, a handgrip assembly comprises a substrate configured in a generally cylindrical shape and a clamp configured to mate with an end portion of the substrate. The handgrip further configures a fastener coupled to the clamp, and the fastener is configured to move the clamp from an engaged position to a disengaged position.

DETAILED DESCRIPTION OF THE DRAWINGS

Figure 1:
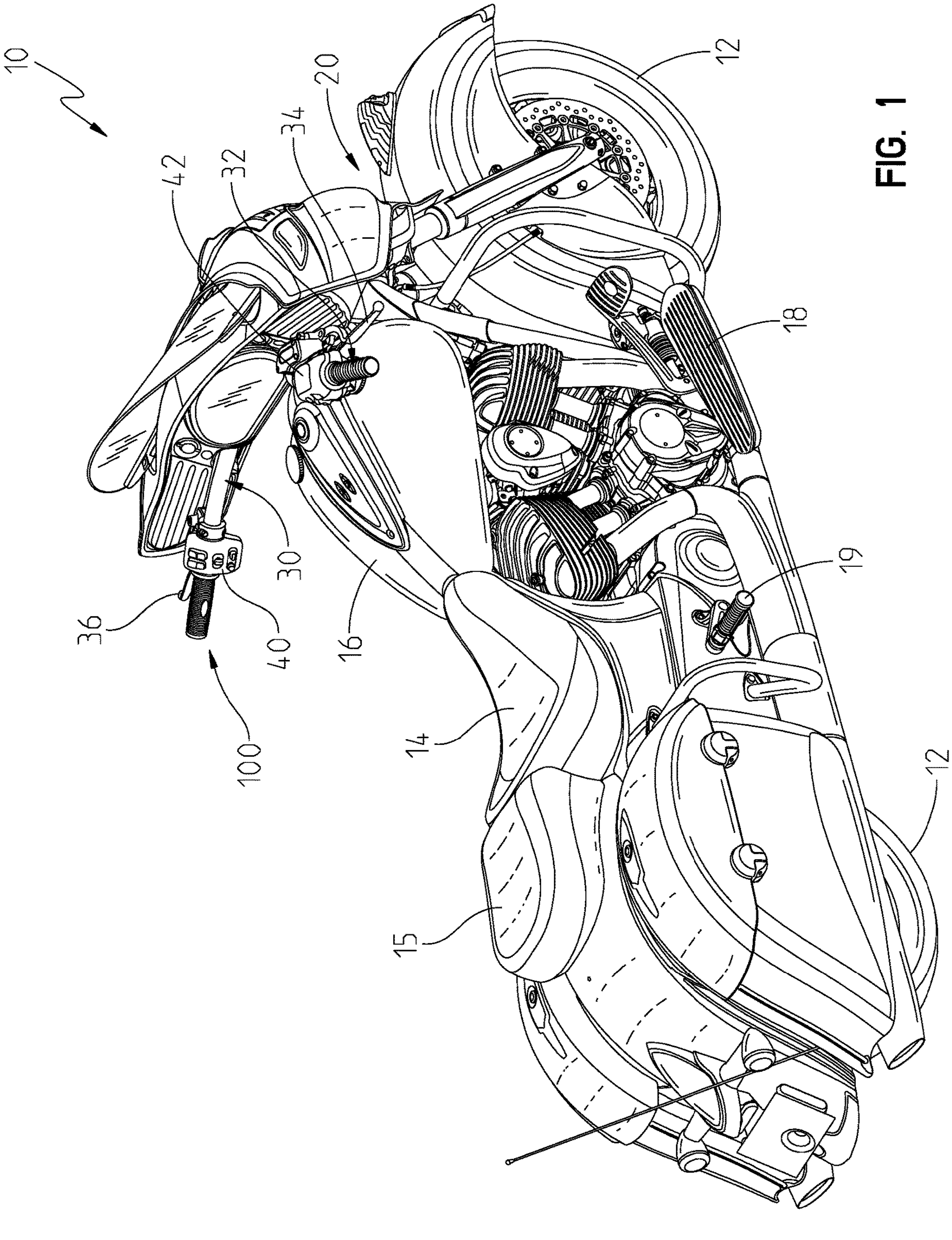
FIG. 1 is a rear right perspective of a vehicle of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

As shown in FIG. 1, a vehicle 10 is shown. Illustratively, vehicle 10 is a motorcycle. Vehicle 10 is supported by a plurality of ground engaging members 12. In an exemplary embodiment, there are two ground engaging members 12, which are shown as wheels. It is understood that tracks, skis, or a variety of other ground engaging members might be used. Vehicle 10 could be a variety of vehicles including, but not limited to, tricycles, snowmobiles, all-terrain vehicles, jet-skis or any other vehicle that utilizes a steering system. In the present embodiment, vehicle 10 further comprises a seat 14 configured to support an operator (not shown) and, in some scenarios, a passenger seat 15. Vehicle 10 further comprises a fuel tank 16 (illustratively located in front of seat 14) and a pair of floorboards or foot supports 18 configured to receive the feet of an operator and a pair of passenger footholds 19 configured to receive the feet of a passenger (not shown).

Still referring to FIG. 1, vehicle 10 comprises a steering assembly 20 operably coupled to ground engaging members 12 to steer the vehicle 10. In the present embodiment, steering assembly 20 comprises a steering input, illustratively a handlebar 30, which may be configured to comprise a left handgrip 100, a right handgrip 32, a brake lever 34, a clutch lever 36, and various other components. Handlebar 30 extends toward the outer lateral extents of vehicle 10 to act as steering arms, being steerable by an operator (not shown). As is generally known, left handgrip 100 is generally stationary, while right handgrip 32 is rotatable wherein the rotation of right handgrip 32 accelerates the vehicle 10. It may be appreciated that left handgrip 100 and right handgrip 32 may include corrugations, protrusions, or other features on their outer facing surface to increase an operator's ability to grip left handgrip 100 and right handgrip 32.

Still referring to FIG. 1, vehicle 10 may incorporate a left switchcube 40 and a right switchcube 42. Left switchcube 40 and right switchcube 42 may comprise a plurality of switches, including a light switch, an enhanced driving system switch, a heated grip switch, an engine kill switch, a volume switch for music or calls, or a switch to control a variety of other components on vehicle 10. Additional details of various components and/or features and functions of steering assembly 20 may be disclosed in U.S. patent application Ser. No. 16/734,846, filed Jan. 6, 2020, and entitled "RECREATIONAL VEHICLES WITH HEATED COMPONENTS," the complete disclosure of which is expressly incorporated by reference herein.

Figure 2:
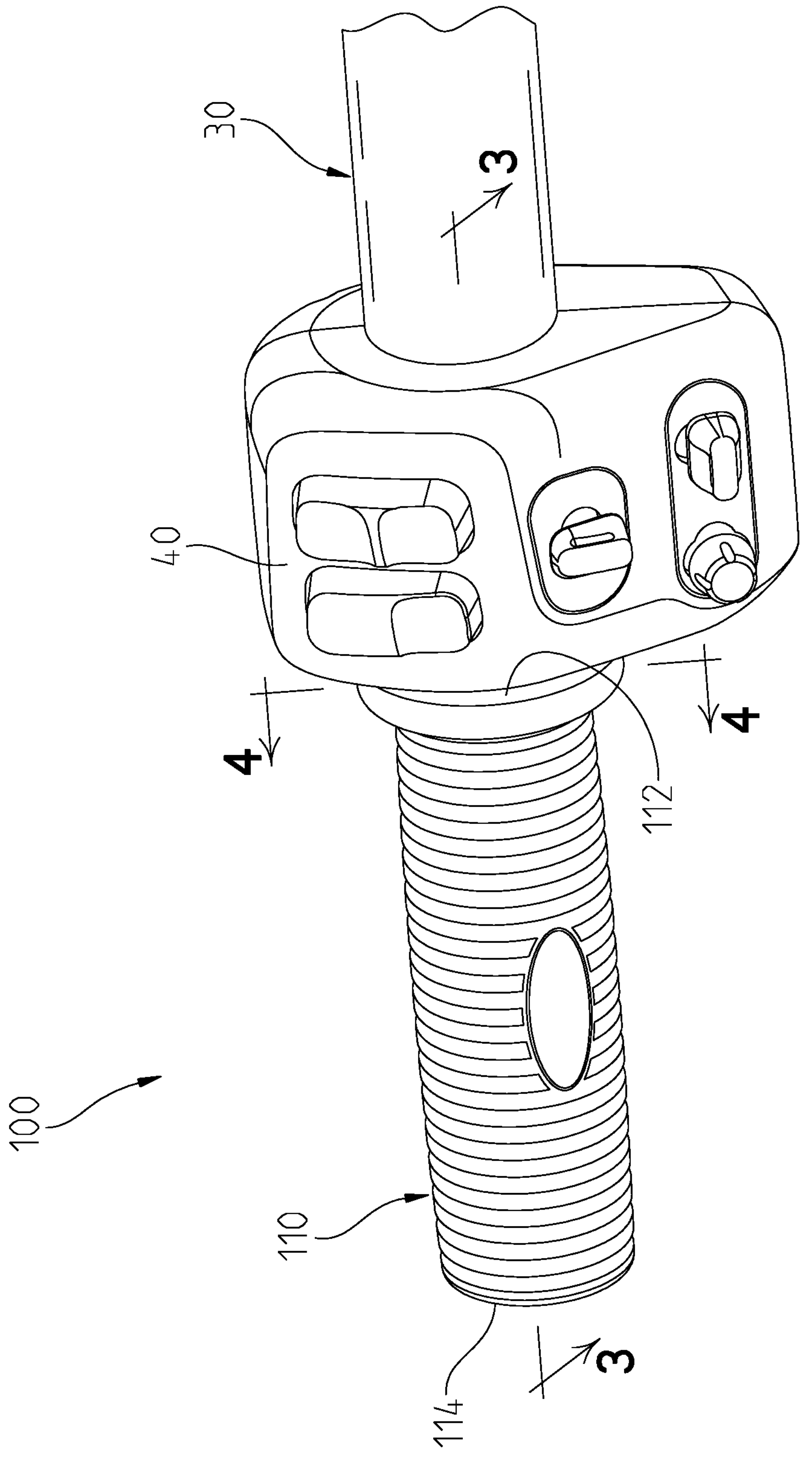
FIG. 2 is a rear right perspective of an outer extent of a steering input, illustratively a handlebar, of the vehicle of FIG. 1.

Turning now to FIG. 2, the present embodiment of left handgrip 100 will be explained in greater detail. Left handgrip 100 illustratively has an overmold grip 110 with an inner end 112 and an outer end 114. Adjacent to inner end 112, left switchcube 40 is positioned so an operator's hand might grip left handgrip 100 while also being able to reach left switchcube 40. In an exemplary embodiment, left switchcube 40 is configured to cooperate with handlebar 30 so that handlebar 30 extends through left switchcube 40.

Figure 3:
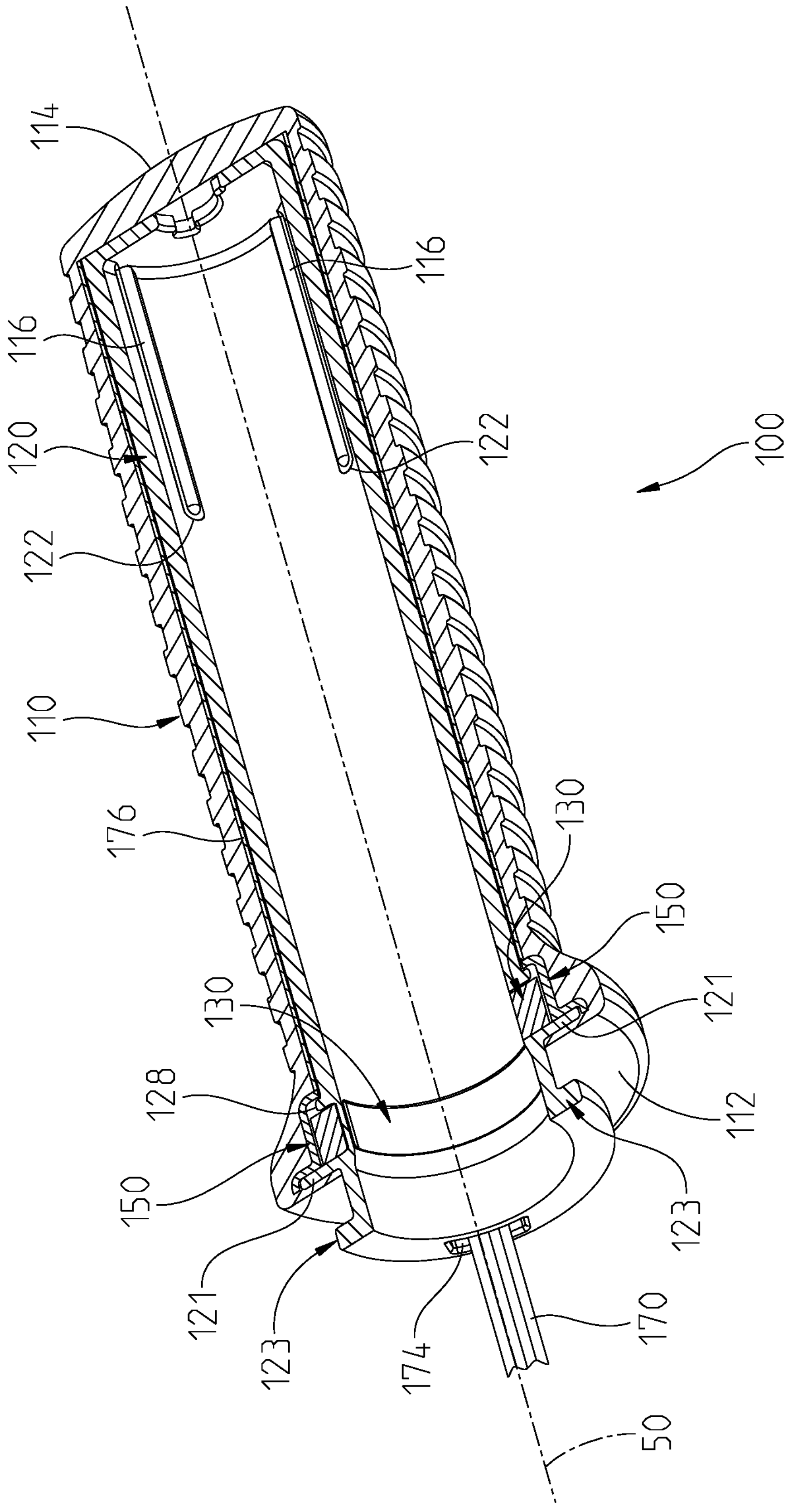
FIG. 3 is a cross-sectional view of a handgrip of the handlebar of FIG. 2, taken along line 3-3 of FIG. 2.

Referring to FIG. 3, a cross section of left handgrip 100 can be seen displaying the construction of left handgrip 100. Illustratively, the base structure of left handgrip 100 is comprised of a substrate 120. In the present embodiment, substrate 120 is configured as a generally cylindrical shape and is designed to slide over an end of handlebar 30. In the present embodiment, a heating cover or element 176 may surround at least a portion of substrate 120 and heating cover 176 may be configured to increase the temperature of left handgrip 100, and specifically overmold grip 110. In this way, an operator's hand that grips overmold grip 110 is warmed during operation of vehicle 10. Illustratively, heating cover 176 is located radially between overmold grip 110 and substrate 120. Substrate 120 is further configured with a first opening 172 (FIG. 5B) in a first flange 121 and a second opening 174 within a second flange 123. First opening 172 and second opening 174 are designed to allow passage of at least one electrical wire(s) 170 through the end of substrate 120. Electrical wires 170 are configured to provide power to heating cover 176. It is understood that heating cover 176 is optional and a configuration of left handgrip 100 without heating cover 176 would be assembled onto left handgrip 100 in substantially the same way as the present disclosure, without the heating capabilities provided by heating cover 176.

Substrate 120 further comprises a plurality of channels 122 and overmold grip 110 comprises a plurality of complementary protrusions 116. In the present embodiment, channels 122 are configured to receive protrusions 116 and assist in the alignment and coupling of overmold grip 110 and substrate 120. In an exemplary embodiment, channels 122 and complementary protrusions 116 may be generally linear in nature, however, it is understood that channels 122 and complementary protrusions 116 may comprise a variety of shapes, configurations, and quantity to assist in the coupling of overmold grip 110 and substrate 120. Additionally, complementary protrusions 116 provide a coupling interface directly between overmold grip 110 and handlebar 30. In the coupling interface between overmold grip 110 and handlebar 30, complementary protrusions 116 acts as an isolator and absorbs vibrations from handlebar 30. Additionally, the coupling interface between overmold grip 110 and handlebar 30 helps prevent rotation of overmold grip 110 relative to substrate 120.

In the present embodiment, substrate 120 further comprises first flange 121 and second flange 123, wherein both first flange 121 and second flange 123 are generally circular. In an exemplary embodiment, first flange 121 has a greater diameter than second flange 123 and first flange 121 is laterally outward of second flange 123. As can be seen in FIG. 3, first flange 121 is configured to engage inner end 112 of overmold grip 110, and although not shown, second flange 123 is configured to engage the interior portion of left switchcube 40 such that left handgrip 100 is coupled to left switchcube 40. In the present embodiment, as can be seen best in FIG. 6, second flange 123 comprises a first clocking feature 127A and a second clocking feature 127B. First clocking feature 127A and second clocking feature 127B are configured to engage complementary features (not shown) of left switchcube 40. Clocking features 127A and 127B ensure that left handgrip 100 is installed in the appropriate configuration relative to left switchcube 40.

Still referring to FIG. 3, left handgrip 100 further comprises a clamp 130 configured to engage substrate 120 and handlebar 30. Clamp 130 will be explained in greater detail below, but it is shown that clamp 130 is located at the generally inner end 112 of left handgrip 100. In the present embodiment, clamp 130 abuts first flange 121 so that clamp 130 is restrained from moving inward along a handgrip longitudinal axis 50. Clamp 130 is also retained by a retention feature 128 molded into substrate 120 such that clamp 130 is restrained from moving outward along a handgrip longitudinal axis 50. In this way, clamp 130 is installed and uninstalled by moving clamp 130 radially outward from substrate 120. FIG. 3 also shows a guard 150 which is configured to cover clamp 130, a portion of substrate 120, first flange 121, and retention feature 128.

Figure 4:
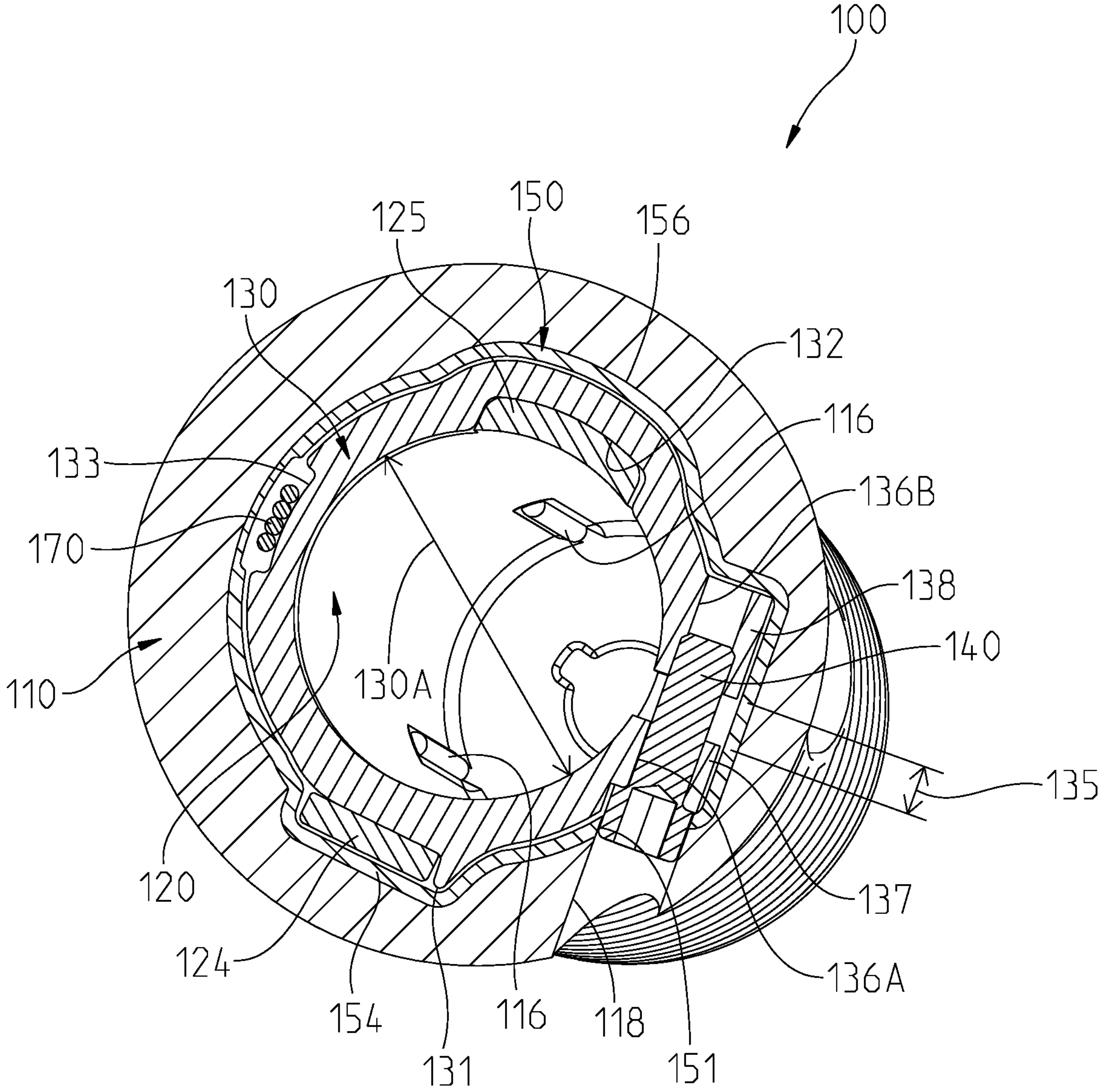
FIG. 4 is a cross-sectional view of the handgrip of FIG. 2, taken along line 4-4 of FIG. 2.

Now turning to FIG. 4, substrate 120 further comprises a first tab 124 and a second tab 125. First tab 124 and second tab 125 are configured to connect first flange 121 and second flange 123 to the main body of substrate 120. This is to increase the structural integrity of substrate 120, but also provides a bridge for material to pass through during the injection molding process, one of several potential manufacturing processes of substrate 120. Clamp 130 is configured to engage first tab 124 at a receiving tab 131, and clamp 130 is further configured to engage second tab 125 at a receiving portion 132. The engagement of clamp 130 to first tab 124 and second tab 125 will be explained further below. Clamp 130 further comprises a wire receiving portion 133 configured to receive electrical wires 170 when heating cover 176 is installed within left handgrip 100. It may be appreciated that receiving portion 133 may contain wire retention features to retain electrical wires 170.

Further, clamp 130 comprises a first end 137 and a second end 138. First end 137 is configured with a first aperture 136A and second end 138 is configured with a second aperture 136B. First end 137 and second end 138 are configured to receive a fastener 140 through first aperture 136A and second aperture 136B. In an exemplary embodiment, aperture 136A is a through-hole and 136B is threaded, and fastener 140 has corresponding threads to pass through aperture 136A and screwed into aperture 136B. Clamp 130 is configured so that when fastener 140 is inserted into apertures 136A and 136B and as fastener 140 is moved into an engaged configuration, first end 137 and second end 138 move closer together. Illustratively, the space between first end 137 and second end 138 is a clamp distance 135. In this way, as fastener 140 is moved into an engaged configuration, and first end 137 and second end 138 move closer together, clamp distance 135 is decreased. Clamp 130 has an inner diameter 130A, and as clamp distance 135 decreases, inner diameter 130A decreases. Conversely, if fastener 140 is disengaged, first end 137 and second end 138 move further apart, thus increasing clamp distance 135 and increasing inner diameter 130A of clamp 130. Clamp 130 is further configured to engage handlebar 30 along at least a portion of the inner diameter 130A of clamp 130. In this way, as clamp distance 135 decreases, inner diameter 130A of clamp 130 is also decreased and clamping force of clamp 130 on handlebar 30 is increased, making it difficult to remove left handgrip 100 from handlebar 30.

Figure 8:
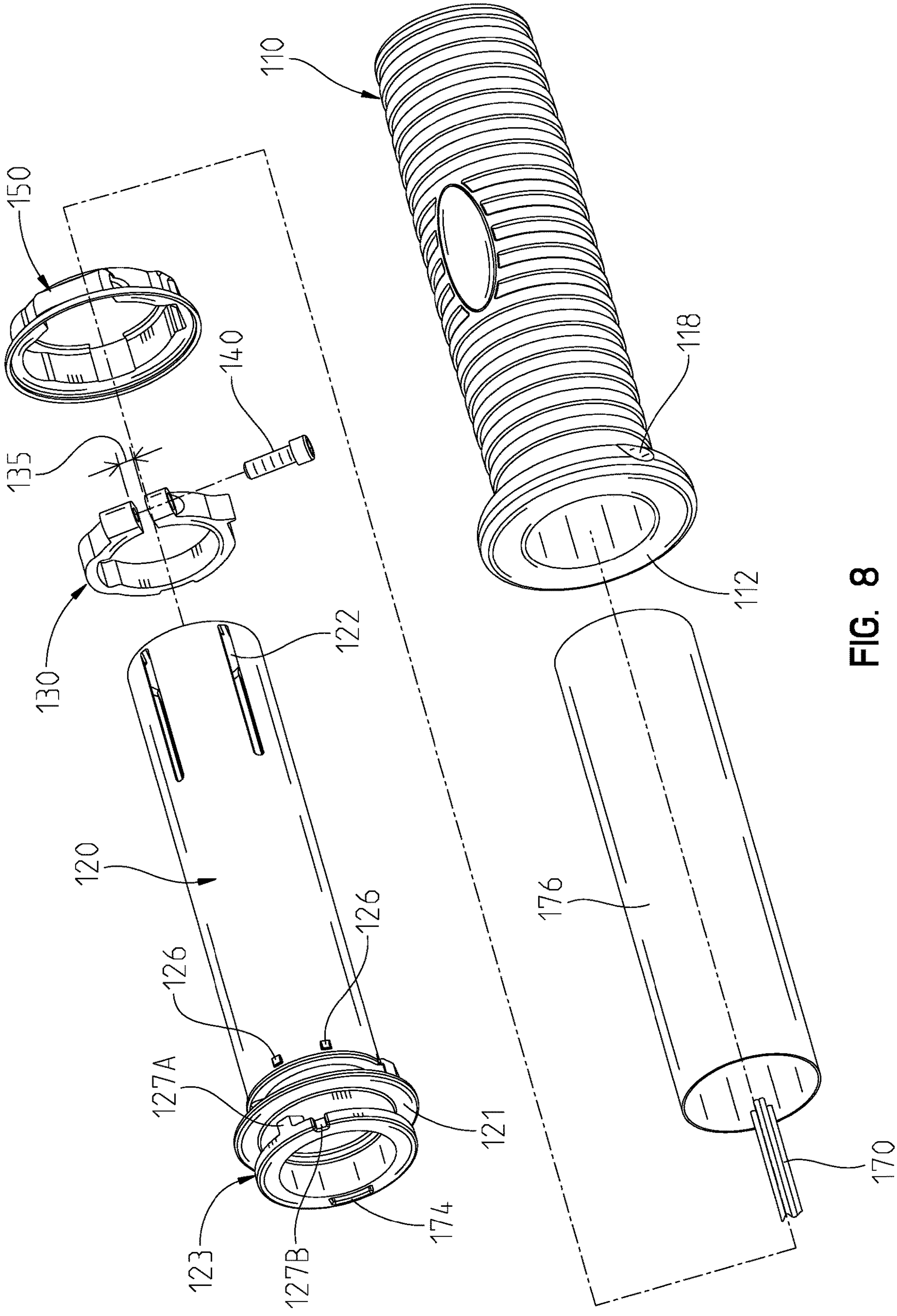
FIG. 8 is an exploded view of the handgrip of FIG. 2.

Still referring to FIG. 4, guard 150 is configured to surround clamp 130. In the present embodiment, the radial outer extent of guard 150 is shaped to profile the outer shape of clamp 130, as well as first tab 124, second tab 125, and fastener 140. As can be seen in FIG. 4 and FIG. 8, guard 150 further comprises a fastener opening 151 configured to receive fastener 140 and allow fastener 140 to pass through guard 150 when guard 150 is covering clamp 130 so that fastener 140 may engage clamp 130 and apertures 136A and 136B. Guard 150 is designed to be installed before the overmold process that molds the overmold grip 110 onto left handgrip 100, and in this way guard 150 protects clamp 130 from the overmolding process of overmold grip 110. Further, overmold grip 110 comprises an opening 118 configured to cooperate with fastener opening 151, and in turn allow fastener 140 to pass through opening 118 as well as fastener opening 151 to be received by apertures 136A and 136B.

Figure 5A:
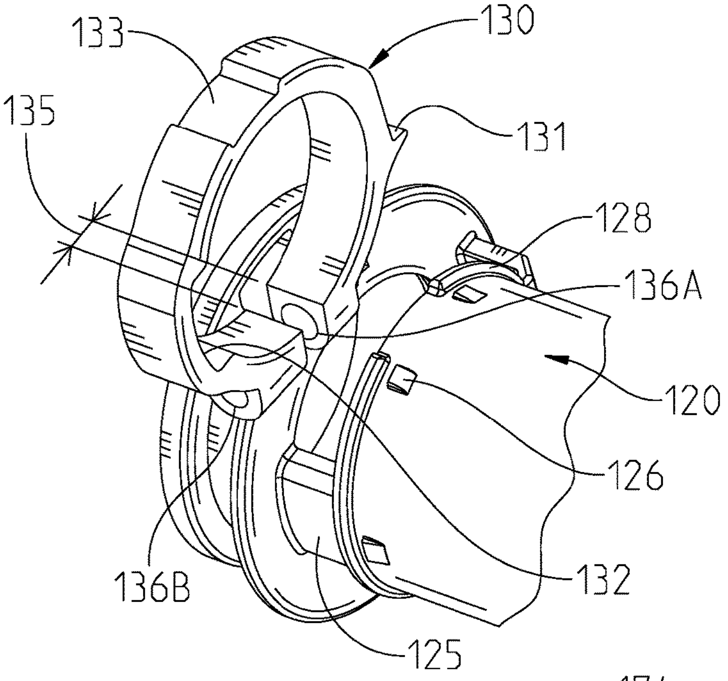
FIG. 5A is a perspective view of the pre-assembly of a clamp with a substrate of the handgrip of FIG. 2.
Figure 5B:
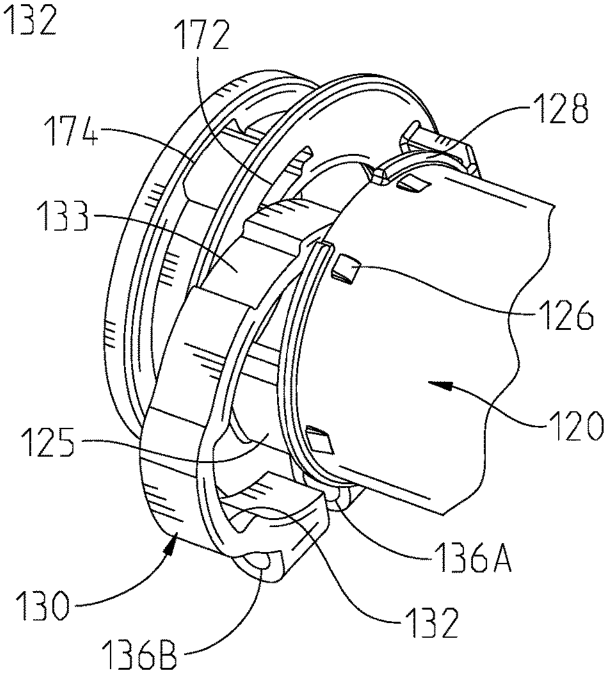
FIG. 5B is a perspective view of a partial assembly of the clamp with the substrate of the handgrip of FIG. 5A.
Figure 5C:
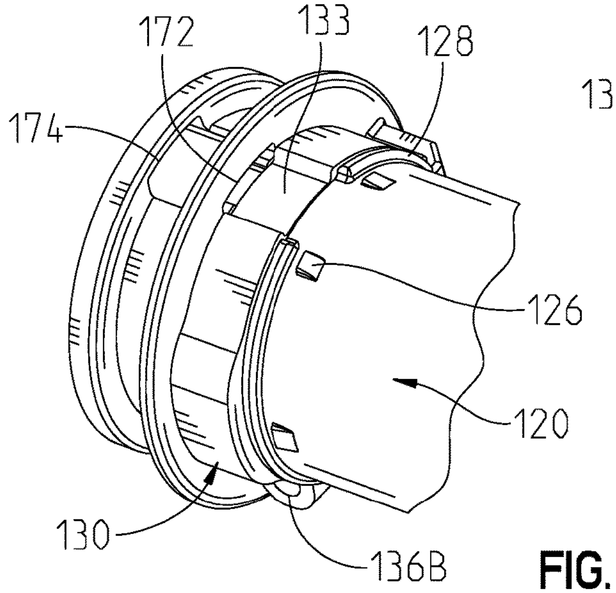
FIG. 5C is a perspective view of an installed or final assembly of the clamp with the substrate of the handgrip of FIG. 5B.

The installation of clamp 130 will be further explained using FIGS. 5A-5C. FIG. 5A illustrates clamp 130 in a first position ready to be installed onto substrate 120. Illustratively, clamp 130 is aligned so that clamp distance 135 may cooperate with second tab 125. Turning to FIG. 5B, clamp 130 is moved into a second position partially installed onto substrate 120. In moving from the first position to the second position, clamp 130 passes over second tab 125 by passing second tab 125 through clamp distance 135.

FIG. 5C represents a third position wherein clamp 130 is fully installed onto substrate 120. This configuration can be seen also in FIG. 3 and FIG. 4. As can be seen in FIG. 5C, wire receiving portion 133 is aligned with first opening 172 and second opening 174 to allow wires to pass through substrate 120 and over clamp 130. Further, during the transition from the second position to the third position, as seen in FIG. 4, receiving tab 131 engages first tab 124 and receiving portion 132 engages second tab 125. The engagement of receiving tab 131 with first tab 124 and receiving portion 132 with second tab 125 provides a standard rotational position for clamp 130 on substrate 120. In this way, clamp 130 is clocked into the standard position so that apertures 136 align with fastener opening 151 and opening 118 (FIG. 4). In this position, as previously described, fastener 140 can be engaged with apertures 136A and 136B to create a friction fit between clamp 130 and handlebar 30 so that left handgrip 100 does not move longitudinally along handgrip longitudinal axis 50.

Figure 6:
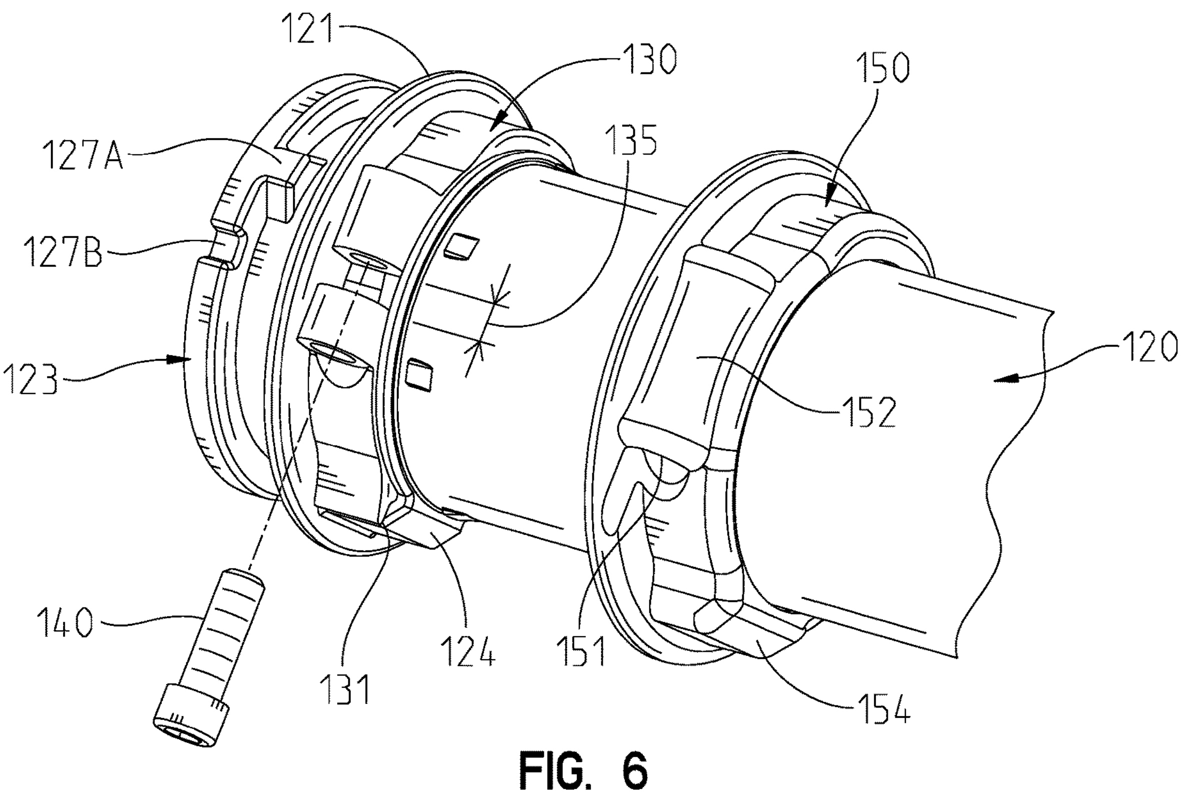
FIG. 6 is a perspective view of a partially installed view of the guard of the handgrip of FIG. 3.
Figure 7:
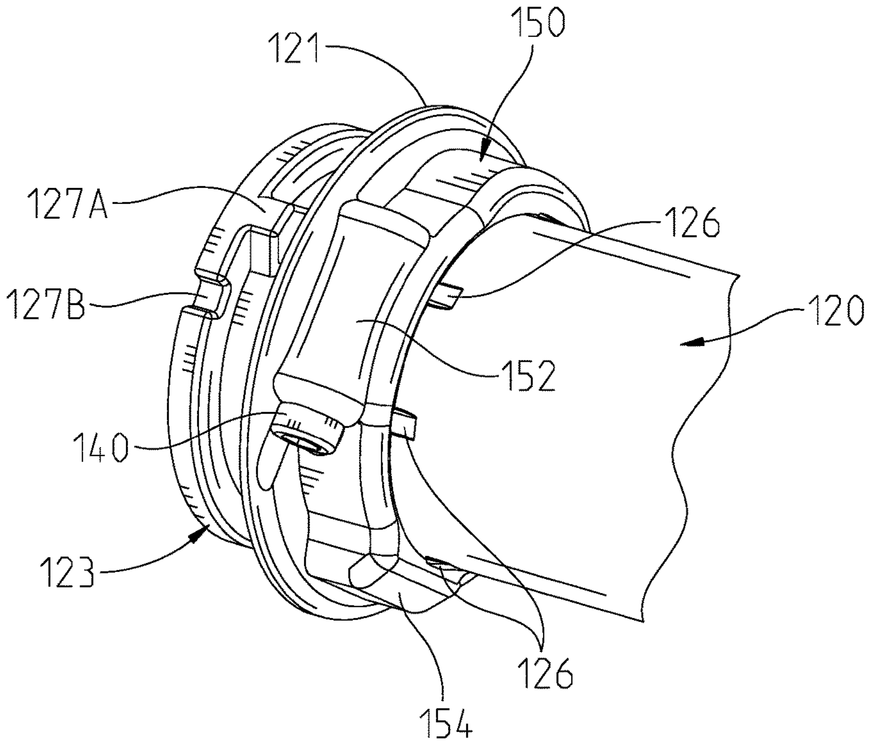
FIG. 7 is a perspective view of the installed assembly of the clamp of FIG. 5C and including a guard of the handgrip of FIG. 2.

As is shown in FIG. 6 and FIG. 7, guard 150 comprises a plurality of profiled surfaces configured to cooperate with the various profiles of clamp 130. In the present embodiment, guard 150 contains a fastener cavity 152, a first tab cavity 154 and a second tab cavity 156 (FIG. 4). Illustratively, guard 150 is designed such that fastener cavity 152 cooperates with first end 137 and second end 138, first tab cavity 154 cooperates with first tab 124 and receiving tab 131, and second tab cavity 156 cooperates with second tab 125 and receiving portion 132. In this way, guard 150 is able to protect these movable components from the overmolding process when overmold grip 110 is molded onto left handgrip 100.

FIG. 6 displays a partially installed position of guard 150. Illustratively, guard 150 is longitudinally displaced along handgrip longitudinal axis 50 and aligned with clamp 130 such that the fastener cavity 152, first tab cavity 154, and second tab cavity 156 are aligned with the complementary profile of clamp 130.

FIG. 7 shows an installed position of guard 150. Illustratively, guard 150 fully covers clamp 130. Further, fastener 140 is positioned within fastener opening 151 and engaged with apertures 136A and 136B (FIG. 4). Guard 150 is also configured to be moveable along substrate 120 along handgrip longitudinal axis 50. Guard 150 is also restrained by first flange 121 on the inner end, and further constrained by notches 126 on substrate 120. In the present embodiment, notches 126 are molded into substrate 120 during the manufacturing process of substrate 120. During the assembly of left handgrip 100, guard 150 is slid onto substrate 120, over notches 126 along handgrip longitudinal axis 50, is restrained from further moving inward by first flange 121, and, once in an installed state, guard 150 is restrained from moving outward by notches 126.

As best seen in FIG. 8, an exploded view of left handgrip 100 is shown, and the manufacture and assembly of left handgrip 100 can be further described. In the present embodiment, substrate 120 and guard 150 are comprised of a polymeric material, such as polypropylene, and may be manufactured using an injection molding process or the like. Further, clamp 130 is comprised of a metallic material (e.g., aluminum) and may be manufactured using an extrusion method, a machining method, a casting method or it may further undergo any combination of extrusion, machining, printing, or the like. As explained previously, clamp 130 is installed on substrate 120 through engagement with first tab 124 and second tab 125. Following installation of clamp 130, guard 150 is slid onto left handgrip 100 into engagement with clamp 130. In an embodiment with heated handgrips, the heating cover 176 is then installed before the overmold grip 110 is molded onto left handgrip 100. Overmold grip 110 is further configured with opening 118 configured to receive fastener 140. Fastener 140 is inserted through opening 118 on overmold grip 110 and guard 150 to engage apertures 136A and 136B of clamp 130. In this way, after final assembly, fastener 140 may be inserted or removed to effectuate a higher or lower clamp force of left handgrip 100 onto handlebar 30.

Figure 9:
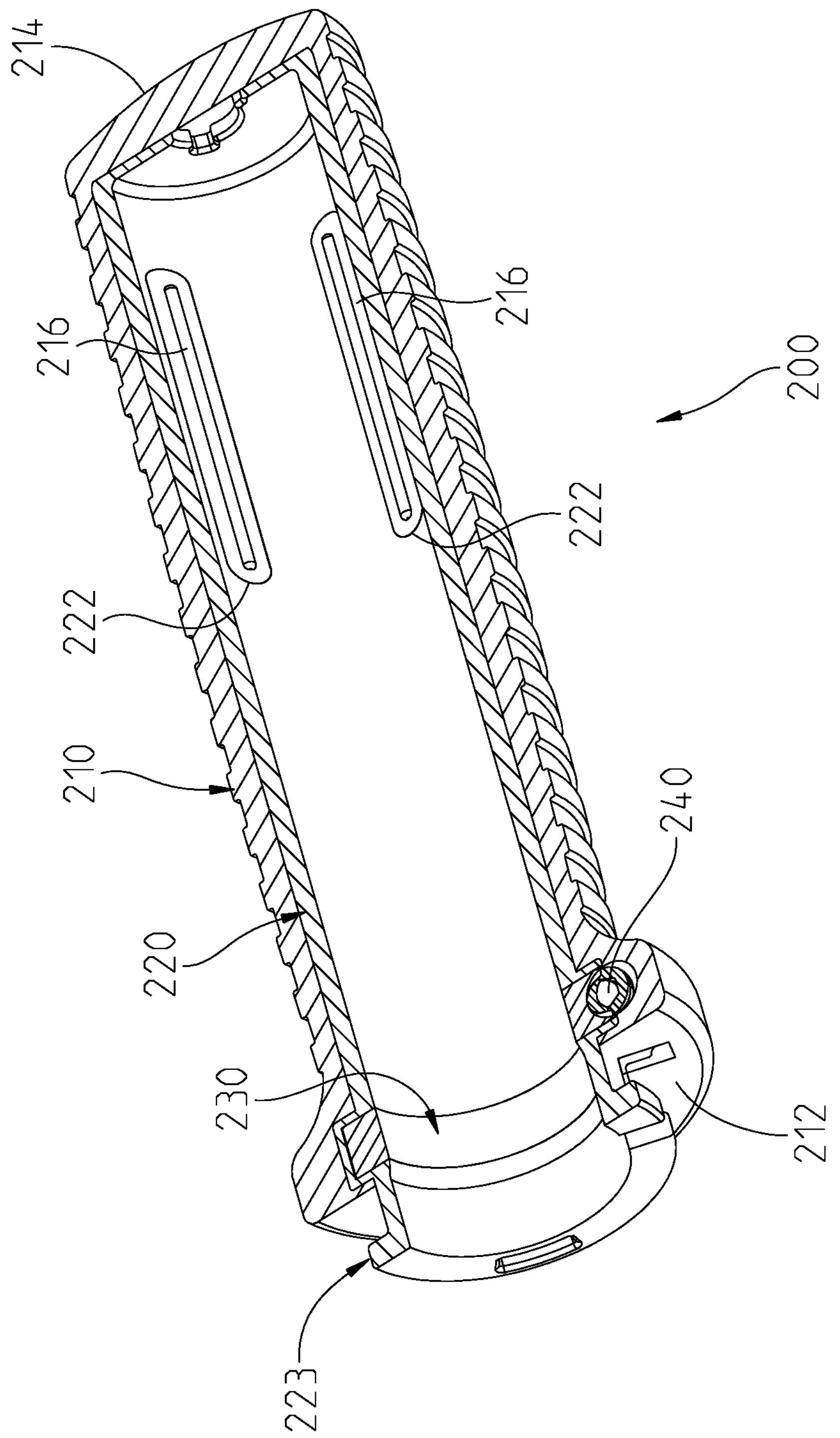
FIG. 9 is a cross-sectional view of an alternative embodiment of the left handgrip of the handlebar of FIG. 2, taken along line 3-3 of FIG. 2.

Another embodiment of a left handgrip will now be explained in greater detail. Turning to FIG. 9, left handgrip 200 is shown as an alternative to left handgrip 100, wherein left handgrip 200 is operably coupled to handlebar 30 of vehicle 10. Further, left handgrip 200 comprises a substrate 220, a clamp 230, and an overmold grip 210. In the present embodiment, clamp 230 is molded in with substrate 220 during the molding process. In this way, clamp 230 is integral with substrate 220, and no further installation of clamp 230 is required. Once substrate 220 is molded around clamp 230, overmold grip 210 is molded over substrate 220 and clamp 230 to create a gripping surface for the hands of the operator. It may be appreciated that a guard similar to guard 150 may be used here as well to protect the components.

Figure 10:
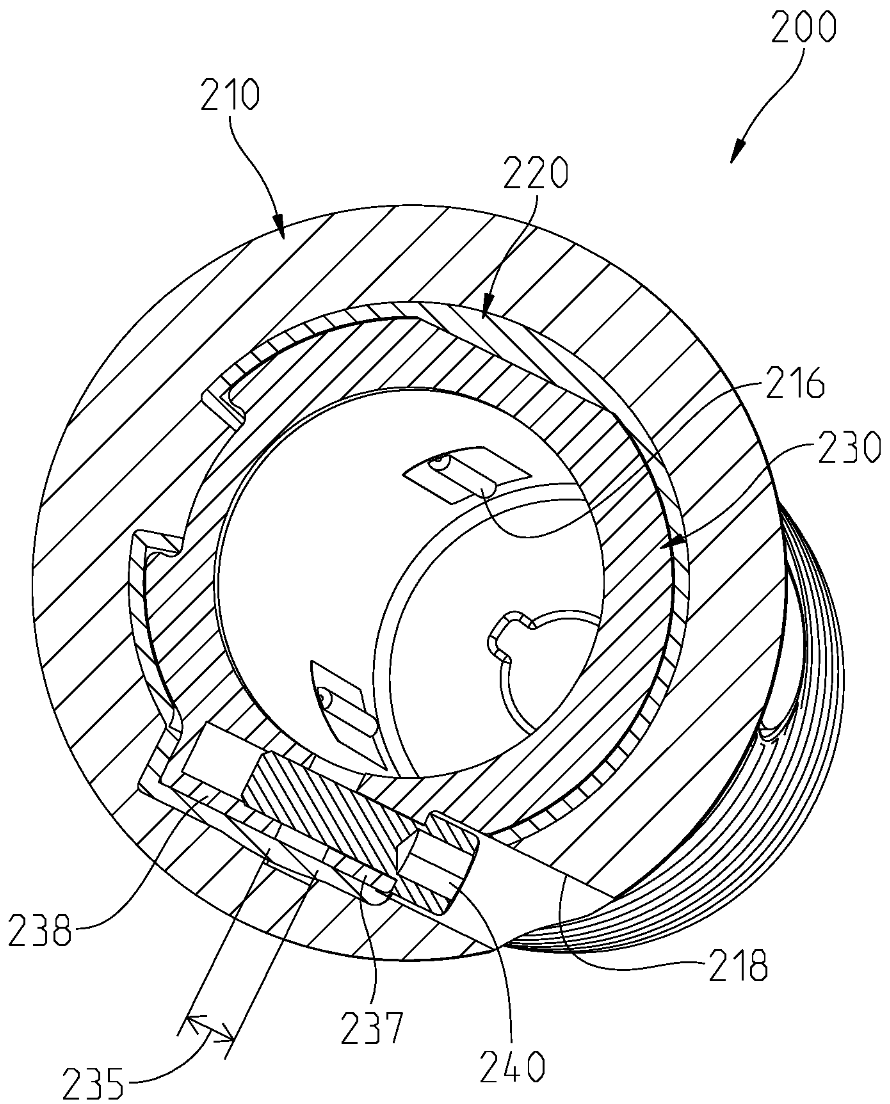
FIG. 10 is a cross-sectional view of the alternative embodiment of the handgrip from FIG. 9, taken along line 4-4 of FIG. 2.

As best shown in FIG. 10, overmold grip 210 comprises an opening 218 configured to receive fastener 240, which is received within an aperture in first end 237 and second end 238 of clamp 230. Fastener 240 may be used to move clamp 230 from a disengaged position to an engaged position wherein the first end 237 and second end 238 will move closer together, thereby decreasing the inside diameter of clamp 230. In this way, the clamping force of clamp 230 on handlebar 30 will be increased, thereby increasing the difficulty of removing left handgrip 200 from handlebar 30.

Further describing the present embodiment, overmold grip 210 may comprise protrusions 216 configured to cooperate with channels 222 in substrate 220. In an exemplary embodiment, the channels 222 and complementary protrusions 216 may be generally linear in nature, however it is understood that channels 222 and complementary protrusions 216 may comprises a variety of shapes, configurations, and quantity to assist in the coupling of overmold grip 210 and substrate 220. Additionally, complementary protrusions 216 provide a coupling interface directly between overmold grip 210 and handlebar 30. In the coupling interface between overmold grip 210 and handlebar 30, complementary protrusions 216 acts as an isolator and absorbs vibrations from handlebar 30. Additionally, the coupling interface between overmold grip 210 and handlebar 30 helps prevent rotation of overmold grip 110 relative to substrate 120.

It should be appreciated that a benefit of the enclosed embodiments is that both left handgrip 100 and left handgrip 200 rely on friction from a clamping force for coupling to handlebar 30. Prior inventions have relied on various adhesives to couple to handlebar 30, and in this way, both left handgrip 100 and left handgrip 200 are configured to couple without any type of adhesive. A particular advantage of the enclosed embodiments is that a vehicle configured with either left handgrip 100 or left handgrip 200 may replace either left handgrip 100 or left handgrip 200 with another type of handgrip more easily. In a configuration with a handgrip coupled with an adhesive, destruction of the handgrip often occurs when the handgrip is removed. Additionally, adhesive residue may remain and cause additional challenges after removal of the handgrip. In the presented disclosure, both left handgrip 100 and left handgrip 200 are capable of being installed without adhesive and therefore do not present the same challenges during a removal process.

Another benefit of the present disclosure is that the fit or tightness of left handgrip 100 or left handgrip 200 on handlebar 30 is increased. Prior inventions that rely on adhesives to couple a handgrip to the handlebar have typically required a greater amount of tolerance designed into the parts which can create undesired movement between the handgrip and handlebar if an adhesive loses its effectiveness or is improperly applied. In the present disclosure, tolerances may be decreased since an adhesive is not used and does not need to be accounted for in the manufacturing process, and the clamp 130 and clamp 230 of left handgrip 100 and left handgrip 200 provide sufficient clamping force to keep left handgrip 100 and left handgrip 200 on handlebar 30.

Another benefit of the present disclosure is that left handgrip 100 and left handgrip 200 may be installed on a variety of handlebars. Left handgrip 100 and left handgrip 200 both require only a friction fit, and do not require any specific features on handlebar 30 to accommodate left handgrip 100 and left handgrip 200. In this way, left handgrip 100 and left handgrip 200 are configured for use on a variety of vehicles.

While reference to left handgrip 100 is disclosed herein, it may be appreciated that a similar assembly method and configuration of components is applicable to right handgrip 32.

Figure 11:
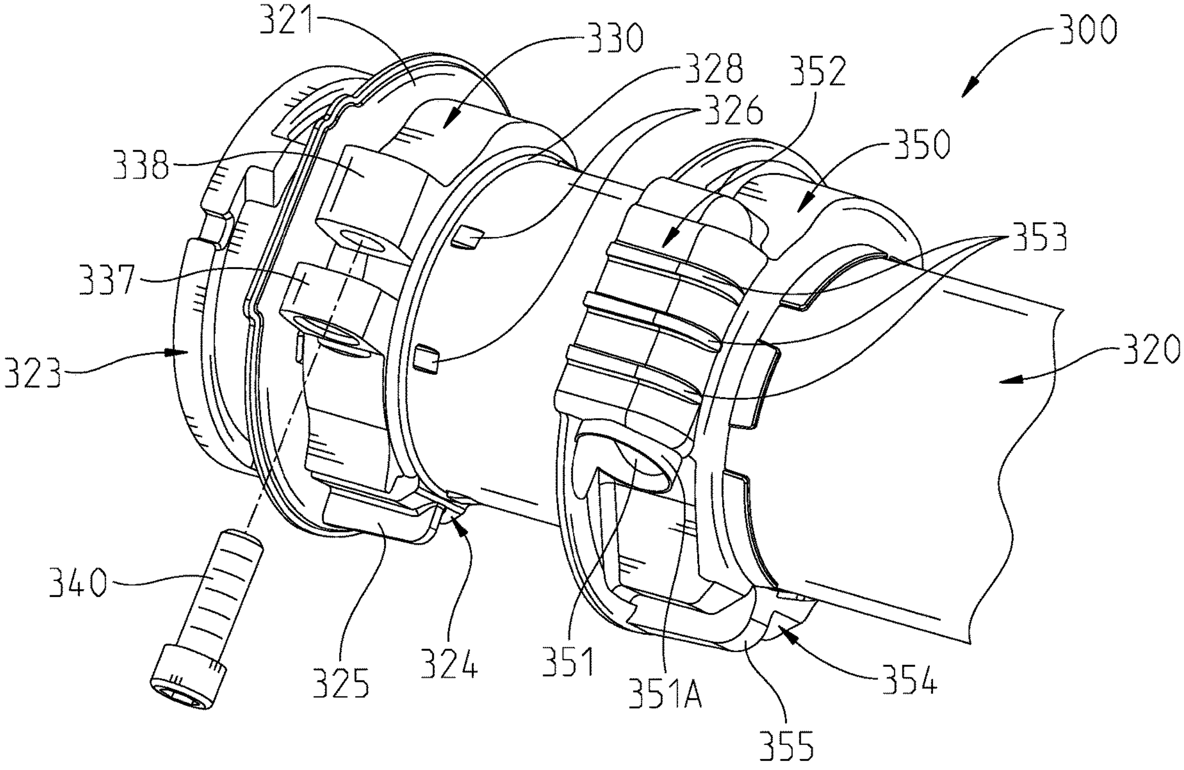
FIG. 11 is a perspective view of a guard assembly of an alternative handgrip of the present disclosure, the guard assembly in an uninstalled state.
Figure 12:
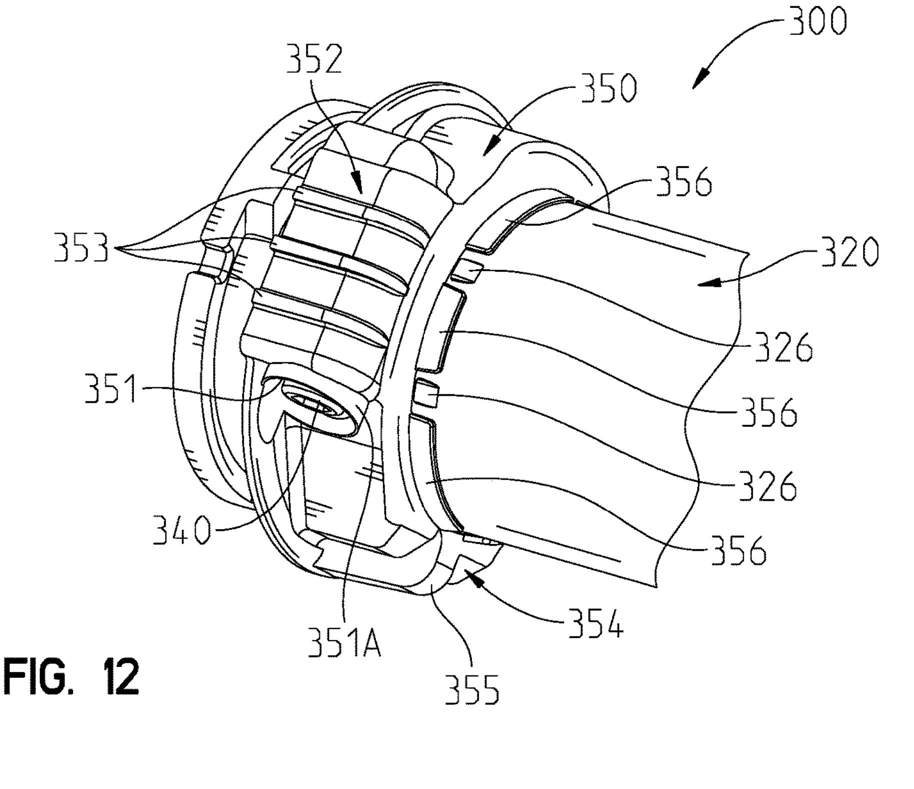
FIG. 12 is a perspective view of the guard assembly of FIG. 11 in an installed state.

Referring now to FIGS. 11-12, an alternate handgrip 300 is provided. As shown in FIGS. 11-12, handgrip 300 comprises a substrate 320 with a first flange 321 and a second flange 323 coupled to the main body of substrate 320 by a first tab 324 and a second tab. While the second tab is not shown, second tab has a similar or identical configuration to tab 125 shown in FIG. 4. In the present embodiment, first tab 324 comprises an extension 325 extending radially outward from first tab 324. While an overmold is not shown, the overmold has a similar or identical configuration to overmold 110 shown in FIG. 2 and is configured to cover substrate 320 to provide a gripping surface for an operator of vehicle 10. Substrate 320 also comprises a plurality of notches 326 spaced around an outside of substrate 320. A retention feature 328 is positioned laterally intermediate notches 326 and first flange 321. Illustratively, retention feature 328 is a flange extending radially outwardly from or about substrate 320. In one embodiment, retention feature 328 may be integrally formed with substrate 320, however, in other embodiments, retention feature 328 may be separate from and substrate 320. A clamp 330 (similar to clamp 130 of FIGS. 5A-5C) is configured to engage substrate 320 substantially in the same way that clamp 130 engages substrate 120, as previously explained. Clamp 330 is positioned laterally intermediate retention feature 328 and first flange 321. Clamp 330 further comprises a first end 337 spaced apart from a second end 338. A fastener 340 is configured to be inserted through first end 337 and threaded into second end 338 to alter the spacing between first end 337 and second end 338.

Handgrip 300 also comprises a guard 350 configured to slide laterally along substrate 320 (FIG. 11). Guard 350 is configured to cover clamp 330 when clamp 330 is engaged on substrate 320 (FIG. 12). Guard 350 is designed to be installed before the overmold process that molds the overmold grip onto left handgrip 300, and in this way guard 350 protects clamp 330 from the overmolding process used to form the overmold grip. Guard 350 comprises a fastener cavity 352 configured to cover the fastener 340, first end 337 and second end 338. Illustratively, fastener cavity comprises a plurality of ribs 353 extending laterally. Ribs 353 are configured to provide additional rigidity and strength to guard 350 as well as to fastener cavity 352 during the overmolding process.

Guard 350 also comprises a fastener opening 351 configured to receive fastener 340. Fastener 340 is configured to extend through fastener opening 351, through first end 337 and thread into second end 338. Fastener 340 operates substantially similar to fastener 140, as previously described. A sleeve 351A extends outwardly from opening 351 to at least partially cover fastener 340 when it is coupled to first end 337 and second end 338.

Guard 350 also comprises a first tab cavity 354 configured to fit over and cover first tab 324. First tab cavity 354 comprises a hollow extension 355 configured to interface with extension 325. That is, first tab cavity 354 and hollow extension 355 cover, and interface with, first tab and extension 325. Extension 325 operates like a clocking member for guard 350 such that guard 350 is prohibited from rotating relative to substrate 320 when engaged with clamp 330.

Still referring to FIGS. 11-12, guard 350 also comprises a plurality of flanges 356 extending laterally outward along substrate 320. In the present embodiment, flanges 356 extend around a portion of substrate 320 and comprise openings configured to receive notches 326. That is, flanges 356 extend between notches 326 around substrate 320. Flanges 356 are configured to add additional clamping force by guard 350 onto substrate 320. During the overmolding process, flanges 356 provide additional protection from additional material flowing underneath guard and contacting clamp 330.

Figure 13:
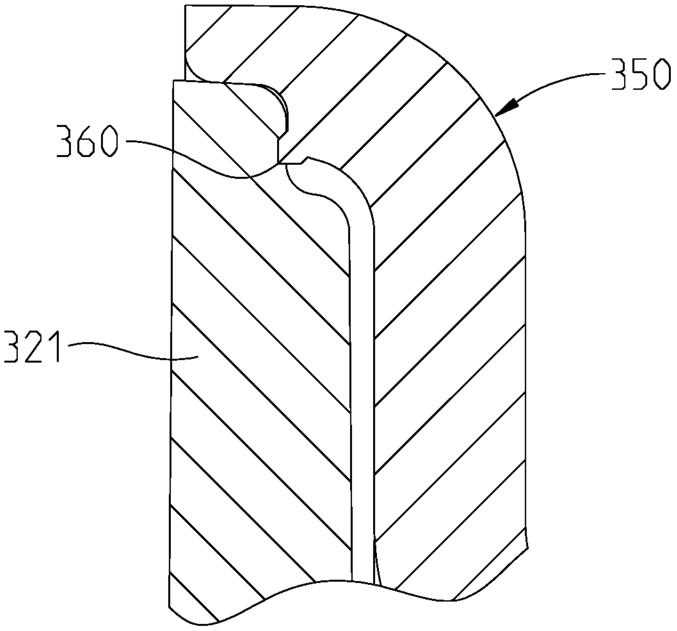
FIG. 13 is a cross-section view of the interface of the guard assembly and a substrate of the alternative guard assembly of FIG. 11.

Referring now to FIG. 13, guard 350 may be coupled to first flange 321 by a plurality of methods. In the present embodiment, guard 350 is coupled to first flange 321 by a sonic welding process. During the sonic welding process, an energy director 360 on the guard 350 is configured to contact first flange 321. A high frequency acoustic vibration is projected at the energy director 360, increasing the thermal energy of the energy director. Subsequently, energy director 360 melts due to the high thermal energy and effectively couples guard 350 to first flange 321. By coupling guard 350 to first flange 321, material is prevented from entering underneath guard 350 during the overmolding process and, thereby is prevented from contacting clamp 330.

EXAMPLES

Example 1. A steering assembly for a vehicle is provided. The steering assembly comprising: a handlebar operably coupled to at least one ground engaging member to steer the at least one ground engaging member; and a handgrip operably coupled to the handlebar. The handgrip comprising: a clamp; a substrate configured to receive the clamp; and an outer portion configured to cover a portion of the substrate. The clamp is configured to engage the handlebar.

Example 2. The steering assembly of Example 1, wherein the clamp includes an aperture configured to receive a screw.

Example 3. The steering assembly of Example 2, wherein the outer portion conceals a portion of the clamp.

Example 4. The steering assembly of Example 3, wherein the outer portion contains an aperture configured to receive the screw.

Example 5. The steering assembly of Example 4, wherein the substrate comprises a plurality of channels configured to receive a plurality of ribs on the outer portion.

Example 6. The steering assembly of Example 1, wherein the clamp is positioned adjacent an inner end of the handlebar.

Example 7. A method of assembling a handgrip is provided. The method comprising: providing a substrate having a generally cylindrical shape; providing a clamp configured to engage a portion of the substrate; and molding an outer portion over the substrate and clamp.

Example 8. The method of assembling a handgrip of Example 7, further comprising: providing a fastener operably coupled to the clamp and a handlebar; positioning the handgrip on the handlebar; fastening the fastener to the clamp; and engaging the clamp to the handlebar.

Example 9. The method of assembling a handgrip of Example 8, further comprising: providing a plurality of channels in the substrate; providing a plurality of extrusions on the inside of the outer portion; and positioning the plurality of extrusions in the plurality of channels.

Example 10. The method of assembling a handgrip of Example 8, wherein the outer portion conceals the clamp.

Example 11. The method of assembling a handgrip of Example 8, further comprising: providing an outer portion configured with an aperture; and inserting the fastener through the aperture.

Example 12. A handgrip assembly, comprising: a substrate configured in a generally cylindrical shape; a clamp configured to mate with an end portion of the substrate; and a fastener coupled to the clamp and configured to move the clamp from an engaged position to a disengaged position.

Example 13. The handgrip assembly of Example 12, further comprising an overmold grip configured to couple with the substrate.

Example 14. The handgrip assembly of Example 13, wherein the overmold grip is configured to conceal a portion of the clamp.

Example 15. The handgrip assembly of Example 14, wherein an outer portion of the overmold has a corrugated surface.

Example 16. The handgrip assembly of Example 14, wherein a guard is positioned intermediate the clamp and the overmold.

Example 17. The handgrip assembly of Example 12, wherein the substrate comprises a plurality of channels configured to receive a plurality of ribs on the outer portion.

Example 18. The handgrip assembly of Example 12, wherein the substrate comprises an opening configured to receive a plurality of wires.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A steering assembly for a vehicle, comprising:

a handlebar operably coupled to at least one ground engaging member to steer the at least one ground engaging member; and a handgrip operably coupled to the handlebar, the handgrip comprising:

a clamp;

a guard configured to receive the clamp;

a substrate configured to receive the clamp and the guard, wherein:

the substrate includes a flange and a plurality of notches;

the guard is configured to:

receive the flange;

engage with the plurality of notches such that the guard is restrained by the flange and the plurality of notches; and the clamp is configured to engage the handlebar; and the substrate comprises a plurality of channels; and an outer portion configured to cover:

a portion of the substrate; and a portion of the guard, wherein the outer portion comprises a plurality of ribs configured to be received in the plurality of channels.

2. The steering assembly of claim 1, wherein the clamp includes an aperture configured to receive a screw.

3. The steering assembly of claim 2, wherein the outer portion conceals a portion of the clamp.

4. The steering assembly of claim 3, wherein the outer portion includes an aperture configured to receive the screw.

5. The steering assembly of claim 1, wherein the clamp is positioned adjacent an inner end of the handlebar.

6. A handgrip assembly, comprising:

a substrate configured in a generally cylindrical shape, wherein the substrate comprises:

a plurality of channels;

a flange; and a plurality of notches;

a clamp configured to mate with an end portion of the substrate, wherein the clamp is positioned between a first flange of the substrate and a retention feature of the substrate;

a guard configured to:

receive the clamp;

receive the flange; and engage with the plurality of notches such that the guard is restrained by the flange and the plurality of notches;

a fastener coupled to the clamp and configured to move the clamp from an engaged position to a disengaged position; and an outer portion configured to cover:

a portion of the substrate; and a portion of the guard.

7. The handgrip assembly of claim 6, further comprising an overmold grip configured to couple with the substrate.

8. The handgrip assembly of claim 7, wherein the overmold grip is configured to conceal a portion of the clamp.

9. The handgrip assembly of claim 8, wherein an outer portion of the overmold grip has a corrugated surface.

10. The handgrip assembly of claim 8, wherein the guard is positioned intermediate the clamp and the overmold grip.

11. The handgrip assembly of claim 6, wherein the substrate comprises an opening configured to receive a plurality of wires.

12. A method of assembling a handgrip, the method comprising:

providing a substrate having a generally cylindrical shape, wherein the substrate comprises a plurality of channels;

providing a clamp configured to engage a portion of the substrate; and molding an outer portion over the substrate and clamp, wherein:

the outer portion comprises a plurality of ribs configured to be received in the plurality of channels; and a guard protects the clamp during the molding process.

13. The method of assembling a handgrip of claim 12, further comprising:

providing a fastener operably coupled to the clamp and a handlebar;

positioning the handgrip on the handlebar;

fastening the fastener to the clamp; and engaging the clamp to the handlebar.

14. The method of assembling a handgrip of claim 13, further comprising:

providing a plurality of extrusions on an inside of the outer portion; and positioning the plurality of extrusions in the plurality of channels.

15. The method of assembling a handgrip of claim 13, wherein the outer portion conceals the clamp.

16. The method of assembling a handgrip of claim 13, wherein the outer portion is provided with an aperture and the method further comprises inserting the fastener through the aperture.

* * * * *